United States Patent Office 3,554,856
Patented Jan. 12, 1971

3,554,856
ACRYLIC POLYMERS AS BINDERS FOR PRESSBOARDS AND COATINGS
Robert E. Opferkuch, Jr., Kettering, Ohio, and Frank Stutz, Pensacola, Fla., assignors to Monsanto Company, St. Louis, Mo., a corporation of Delaware
No Drawing. Continuation-in-part of application Ser. No. 450,157, Apr. 22, 1965, which is a continuation-in-part of application Ser. No. 413,336, Nov. 23, 1964, both now abandoned. This application Dec. 17, 1969, Ser. No. 886,023
Int. Cl. B32b 5/16, 21/02
U.S. Cl. 161—218                    18 Claims

ABSTRACT OF THE DISCLOSURE

A pressboard comprised of a mixture of acrylic polymers and wood particles is prepared by subjecting the mixture to heat and pressure conditions for a time sufficient to convert the polymer into a viscous mass for bonding the wood particles.

This is a continuation-in-part application of our co-pending application S.N. 450,157, filed Apr. 22, 1965, now abandoned the latter being a continuation-in-part of co-pending application Ser. No. 413,336, filed Nov. 23, 1964 (now abandoned).

BACKGROUND OF THE INVENTION

The present invention relates to structural materials and more particularly to new compositions useful in the manufacture of pressboards and coatings.

In accordance with the present invention, there has been combined the characteristics of acrylonitrile polymers used for the production of textile materials with the characteristics of certain filler materials, such as sawdust, wood chips, sand, pebbles, crushed rock and the like to produce high quality pressboards. Further, in accordance with the present invention, these materials may be mixed with colored pigments to impart attractive permanent colors to the pressboard, or a metallic powder may be added to provide a conductive coating thereon.

Heretofore, the producers have used various thermoplastic and thermosetting resins as binding or bonding agents in the preparation and manufacture of pressboards. It is to be noted, however, that acrylonitrile polymers have not been utilized. This particular lack of utility for acrylonitrile has been occasioned by the belief that acrylonitrile polymers do not possess the binding or bonding qualities demanded in the production of pressboards for the reason that under normal conditions acrylonitrile polymers will decompose rather than melt when heated at elevated temperatures ranging above about 100° C. The discovery has now been made that when an acrylic polymer is subjected to temperature and pressure in the presence of some moisture the polymer enters into a melt phase comprised of a viscous mass and moisture. It has been found that industrial waste products, such as sawdust and wood chips contain enough moisture in their normally occurring state to facilitate the formation of a bond between the wood material and the polymer when the mixture is subjected to heat and pressure. The composition may preferably include other constituents to form pressboards having particularly desirable properties, the only limitation being that a proper ratio of acrylic polymers and wood materials be used to produce pressboards possessing good strength and woodworking qualities. The mixture may contain up to about 50 percent moisture, but better results are obtained when the moisture level is below 15 percent. Where a high moisture content is employed, the molded article must be cooled enough to return the steam to condensate before releasing the press to avoid possible deterioration of the molded article.

DESCRIPTION OF THE PREFERRED EMBODIMENTS

The invention is applicable to polymers containing at least 85 percent by weight of acrylonitrile units in polymeric form. These include polymers formed from polyacrylonitrile, copolymers, including binary and ternary polymers containing at least 85 percent by weight of acrylonitrile in the polymer molecule, or a blend comprising polyacrylonitrile and copolymers comprising acrylonitrile with from 2 to 50 percent of another polymeric material, the blend having an overall polymerized acrylonitrile content of at least 85 percent by weight.

For example, the polymer may be a copolymer of from 85 to 98 percent acrylonitrile and from 2 to 20 percent of another monomer containing the $>$C$=$C$<$ linkage and copolymerizable with acrylonitrile. Suitable mono-olefinic monomers, include acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro - 1 - bromo-ethylene; methacrylonitrile; acrylamide and methacrylamide; alpha-chloroacrylamide; or monoalkyl substitution products thereof, methylvinyl ketone; vinyl carboxylates, such as vinyl acetate, vinyl chloroacetate, vinyl propionate, and vinyl stearate; N-vinylimides, such as N-vinylphthalimine and N-vinylsuccinimide, methylene malonic esters, itaconic acid and itaconic esters; N-vinylcarbazole, vinyl furane; alkyl vinyl esters; vinyl sulfonic acid; ethylene alpha, beta-dicarboxylic acids or their anhydrides or derivatives, such as diethylcitraconate, diethylmesaconate, styrene, vinyl naphthalene; vinyl-substituted tertiary heterocyclic amines, such as the vinylpyridines and alkyl-substituted vinylpyridines, for example, 2-vinylpyridine, 4-vinylpyridine, 2-methyl-5-vinylpyridine, etc.; 1-vinylimidazole and alkyl-substituted 1-vinylimidazoles, such as 2-, 4-, or 5-methyl-1-vinylimidazole, and other $>$C$=$C$<$ containing polymerizable materials.

The polymer may be a ternary or higher interpolymer, for example, products obtained by the interpolymerization of acrylonitrile and two or more of any of the monomers, other than acrylonitrile enumerated above. More specifically, and preferably the ternary polymer comprises acrylonitrile, methacrylonitrile, and 2-vinylpyridine. The ternary polymer preferably contains from 85 to 98 percent of acrylonitrile, from 1 to 10 percent of a vinylpyridine of a 1-vinylimidazole, and from 1 to 18 percent of another substance such a methacrylonitrile or vinyl chloride.

The polymer may also be a blend of a polyacrylonitrile or of a binary interpolymer of from 80 to 99 percent acrylonitrile and from 1 to 20 percent of at least one other $>$C$=$C$<$ containing substance with from 2 to 50 percent of the weight of the blend of a copolymer of from 10 to 70 percent of acrylonitrile (so long as it is composed of at least about 85% by weight of acrylonitrile units) and from 30 to 90 percent of at least one other $>$C$=$C$<$ containing polymerizable monomer. Preferably, when the polymeric material comprises a blend, it will be a blend of a copolymer of 90 to 98 percent acrylonitrile and from 2 to 10 percent of another mono-olefinic monomer, such as vinyl acetate, with a sufficient amount of a copolymer of from 10 to 70 percent of acrylonitrile and from 30 to 90 percent of a vinyl-substituted tertiary heterocyclic amine, such as vinylpyridine or 1-vinylimidazole, to give a dyeable blend having an overall vinyl-substituted tertiary heterocyclic amine content of from 2 to 10 percent based on the weight of the blend.

It is well known that these so-called "acrylic polymers" have unique properties in that they are definitely not thermosetting, and they exhibit a temperature range of softening during which decomposition occurs. It is the discovery of process conditions which utilize these rather unique properties of acrylic polymers in producing pressboards which constitute the essence of one aspect of this invention.

In a preferred form of the present invention, the ratio by weight of 20 percent acrylic polymers and 80 percent 16 mesh sawdust having a low moisture content are thoroughly mixed and poured into a mold heated to 350–400° F. and compressed at 1600 p.s.i. for 5 minutes. The resulting pressboards exhibit excellent qualities, such as static strength, impact strength, dynamic strength, hardness, resistance to heat, cold, weather, moisture, and ease of workability such as nailing, drilling, and cutting. Furthermore, the pressboards do not split, chip, break, or tear when being worked under normal conditions. Of course, wide variances in materials and conditions may be employed depending upon the particular qualities desired. Ratios varying from 10 to 100 percent of acrylic polymer may be used with any proportion of the other materials to make up the remainder of the composition. The composition will yield a pressboard when heated from 200 to 450° F. for about 5 to 60 minutes and subjected to pressures ranging from 500 to 4000 p.s.i. Since wood begins to oxidize at approximately 400° F. the temperature should be limited to this level when the composition contains a large proportion of sawdust or wood chips.

Another form of the invention contemplates the provision of attractive, permanent colors being imparted to the surfaces of the pressboard or other articles by pressing colored pigments onto the product as a coating or facing which may be applied to either or both sides. This may be accomplished by introducing the pigments into the mold to form an initial layer before pouring the mixture of acrylonitrile and filler materials into the mold to form the pressboard. Alternatively, the pigments may be mixed with the other materials to disperse the colors throughout the pressboard or structure being made.

Still another important form of the present invention is a pressboard of the type described herein and having a metal powder such as zinc or aluminum pressed onto the surface thereof to provide an electrically conductive coating. The metal powder may be pressed onto the board in the same manner as the pigments. It has been found that good conductivity is achieved from a thin coating depending, however, upon the purity of the metal powder used.

Further to illustrate the invention are a number of examples showing some specific formulations thereof.

EXAMPLE I

Twenty-five grams of a copolymer consisting of 93% acrylonitrile and 7% vinyl acetate was well mixed with 100 grams of approximately 16 mesh sawdust having 5 percent moisture. The mixture was placed in a 2 x 3 inch mold of a laboratory press heated at 400° F. and compressed at 1600 p.s.i. for 5 minutes. The pressure was released and the sample board removed from the mold and allowed to cool. The sample was then evaluated for static strength, dynamic strength, water and weather resistant and woodworking characteristics, as herein before described. The results of these tests are presented below:

Static Strength, $b = 169$ kg./cm.$^2$
Dynamic Strength, $N = 0.93$, $P = 1.90$ in kg./cm.$^2$
Hardness, $HB = 5.2$ kg./mm.$^2$ Moisture gain after 5 minutes in boiling water was about 20% with a corresponding increase in thickness in 15%. The board exhibited good woodworking qualities and could be sawed, drilled, or nailed without difficulty using conventional woodworking equipment.

EXAMPLE II

The procedure of Example I was repeated at various molding conditions of time, temperature, and pressure. The samples obtained were evaluated for static strength by the standard testing procedure. The data are presented in Table I below:

TABLE I.—MOLDING CONDITIONS

| Sample No.: | Time, minutes | Temperature, °F. | Pressure, p.s.i. | Static strength |
|---|---|---|---|---|
| A | 5 | 360 | 6,600 | 191 |
| B | 5 | 370 | 3,300 | 196 |
| C | 5 | 350 | 1,670 | 195 |
| D | 10 | 370 | 3,300 | 172 |
| F | 10 | 350 | 1,670 | 175 |
| E | 20 | 400 | 1,670 | 185 |
| G | 60 | 350 | 1,670 | 206 |
| H | 10 | 200 | 1,670 | 78 |
| I | 10 | 250 | 1,670 | 75 |
| J | 20 | 250 | 1,670 | 95 |

It is apparent from the above data that there is no advantage in increasing the molding time above 5 minutes, or the molding pressure above 1670 p.s.i. Temperatures of 350 to 400° F. are satisfactory, but the strength of the molded sample is considerably less if temperatures of 200 or 250° F. are used, as illustrated by samples H, I and J above. Temperatures in excess of 400° cause decomposition of the wood, and therefore are unsatisfactory.

EXAMPLE III

Twenty-five grams of a copolymer consisting of 95% acrylonitrile and 5% vinyl acetate was well mixed with 100 grams of approximately 16 mesh sawdust having 10 percent moisture. The mixture was molded into six 2 x 3 inch samples by compressing at 1670 p.s.i. and 450° F. for 5 minutes. Three of the samples were released then repressed under the same conditions. The results of static and dynamic strength tests on the standard and repressed samples are given below in Table 2.

TABLE 2

| | Static strength | Dynamic strength | Samples repressed Static strength | Dynamic strength |
|---|---|---|---|---|
| Sample: | | | | |
| A | 169 | 2.1 | 222 | 2.8 |
| B | 183 | 2.3 | 247 | 3.3 |
| C | 168 | 1.9 | 246 | 2.7 |
| Average | 173 | 2.1 | 238 | 2.9 |

The above data indicated that repressing the samples improved their physical properties substantially.

EXAMPLE IV

Ten grams of a copolymer consisting of 90% acrylonitrile and 10% vinylacetate was mixed with 10 grams of Textile Yellow Toner Y–5776 pigment (Harmen Colors, Allied Chemical Corp.) and the mixture distributed to an even depth across the bottom of a 2 x 3 inch mold. A second mixture consisting of 25 grams of the same copolymer and 100 grams of approximately 16 mesh sawdust having .25 percent moisture was placed in the mold over the pigment mixture. The mass was then compressed at 1670 p.s.i. and 400° F. for 5 minutes. When removed from the mold, the sample had a uniformly colored surface which was an integral and permanent part of the sample, and the product was suitable for decorative or other use where a permanent color might be desirable.

EXAMPLE V

The process of Example IV was repeated substituting powdered zinc (Fisher, certified 98%) for the pigment in the polymer pigment mixture. A zinc coated board was thereby obtained which showed an electrical resistance of about 0.5 ohm/cm.

EXAMPLE VI

Nineteen percent by weight of titanium dioxide was added to 120 grams of a mixture of 20% polymer consisting of 85% acrylonitrile and 15% vinyl acetate and 80% 12 mesh sawdust having 20% moisture. The mixture was pressed at 1670 p.s.i. and 400° F. for 5 minutes. The pressed sample had a good white color which was permanent and uniform throughout the sample.

EXAMPLE VII

Thirty grams of a polymer consisting of 92% acrylonitrile and 8% vinyl acetate was mixed with 60 grams of approximately 20 mesh clean white sand and 10 grams of distilled water. The mixture was placed in the laboratory press and compressed at 3330 p.s.i. and 400° F. for 5 minutes. The resulting sample had a rough, textured surface, and a static strength of 104 kg./cm.$^2$.

EXAMPLE VIII

A number of samples were prepared to evaluate different ratios of polymer to sawdust with respect to physical strength. The polymer employed was a copolymer of 93% acrylonitrile and 7% vinyl acetate, and the sawdust was predominately coarse pine of approximately 14 mesh particle size. The samples were pressed at 3330 p.s.i. and 375° F. for 5 minutes. The static strength of the samples is tabulated below in Table 3.

TABLE 3

| Sample: | Percent polymer | Percent sawdust | Percent moisture | Static strength |
|---|---|---|---|---|
| A | 10 | 90 | 10 | 21 |
| B | 15 | 85 | 10 | 68 |
| C | 20 | 80 | 10 | 169 |
| D | 40 | 60 | 10 | 195 |
| E | 60 | 40 | 10 | 219 |
| F | 100 | 0 | 10 | 259 |

The above data shows that a considerable increase in sample strength is obtained by increasing the polymer content up to 20%, and that the improvement continues but at a lower rate up to 100% polymer.

It will be apparent to the trade that the inventive concepts described and illustrated herein can be carried out on any of the well known apparatus normally used in the production of heat and pressure bonded products provided the heat and pressure conditions required for the present invention can be achieved. While the invention is referred to primarily in conjunction with pressboards, it is to be understood that other shaped articles can be formed from the compositions described herein and the invention is not to be limited except as set forth in the claims.

We claim:

1. A composite structure composed of a mixture of materials consisting essentially of a polymer containing at least 85% by weight of acrylonitrile in polymeric form and wood particles being heat and pressure bonded together.

2. The composite structure of claim 1 wherein the mixture of materials comprises at least 10 percent of the acrylonitrile-containing polymer and no more than 90 percent wood particles.

3. The composite structure of claim 2 further characterized by the mixture containing from 1 to 20 percent of moisture.

4. The composite structure of claim 1 wherein the mixture of materials consists of 20 percent of said acrylonitrile-containing polymer and 80 percent sawdust.

5. The composite structure of claim 1 wherein the mixture of materials consists of at least 10 percent of acrylonitrile-containing polymer and 10 percent pigments.

6. The composite structure of claim 1 further characterized by a pigmented coating on at least one surface thereof.

7. The composite structure of claim 1 further characterized by a conductive layer of metal coating on at least one surface thereof.

8. A pressboard composed of a mixture of materials consisting of a polymer containing at least 85 percent acrylonitrile, wood particles and sand being heat and pressure bonded together.

9. The pressboard of claim 8 wherein the mixture has from 1 to 20 percent moisture content.

10. The pressboard of claim 8 wherein the mixture of materials consists of at least 10 percent acrylonitrile-containing polymer.

11. A method for producing pressboards comprising the steps of mixing a polymer containing at least 85 percent acrylonitrile with wood particles and subjecting the mixture to heat and pressure to convert the polymer into a viscous mass for bonding the wood particles together when the mixture is compressed.

12. The method of claim 11 wherein the mixture is heated to at least 200° F. and compressed to at least 500 p.s.i. for about 5 minutes.

13. The method of claim 11 wherein the mixture is heated to about 40° F. and compressed for at least 5 minutes at 1670 p.s.i.

14. A method for producing pressboards having permanent ornamental colors comprising the steps of mixing pigments with a polymer containing at least 85 percent acrylonitrile, and wood particles, subjecting the mixture to from 200 to 400° F. and 500 to 4000 p.s.i. for at least 5 minutes thereby converting the polymer into a viscous mass for bonding the remainder of the mixture together.

15. A method for producing pressboards having electrical conductive surfaces comprising the steps of uniformly distributing approximately 1:1 mixture of a polymer containing at least 85 percent acrylonitrile and metal powder on a depth of about a 1:4 mixture of a polymer containing at least 85 percent acrylonitrile, and sawdust; subjecting both layers to about 400° F. and 1670 p.s.i. for about 5 minutes to convert the copolymers into a viscous solution for bonding together the sawdust in metal powder.

16. A method for producing pressed structures comprising the steps of mixing a polymer containing at least 85 percent acrylonitrile with wood particles, subjecting the mixture to an elevated temperature and pressure to form a composite structure, cooling the composite structure to ambient temperature, and again subjecting the composite structure to an elevated temperature and pressure.

17. The method of claim 16 wherein the mixture and composite structure are heated to at least 200° F. and compressed to at least 500 p.s.i. for about 5 minutes.

18. The method of claim 16 wherein the mixture and composite structure are heated to about 400° F. and compressed for about 5 minutes at 1670 p.s.i.

References Cited

UNITED STATES PATENTS

| | | | |
|---|---|---|---|
| 2,425,192 | 8/1947 | Kropa | 260—85.5 |
| 2,624,722 | 1/1953 | Kropa et al. | 260—85.5 |
| 2,817,617 | 12/1957 | Rogers | 161—162X |
| 2,947,654 | 8/1960 | Chapman | 161—162 |
| 2,994,676 | 8/1961 | Kucsan | 260—17.4 |
| 3,309,444 | 3/1967 | Schueler | 264—109 |

OTHER REFERENCES

"Fiberboard & Particle Board," published by Food & Agriculture Organization of the United Nations 1959, pp. 70–74.

ROBERT F. BURNETT, Primary Examiner

R. L. MAY, Assistant Examiner

U.S. Cl. X.R.

117—160; 156—331, 62.2; 260—17.4, 85.5; 264—109, 131